United States Patent
Pettersson et al.

(10) Patent No.: US 11,012,685 B2
(45) Date of Patent: May 18, 2021

(54) SCENE CHANGE DETECTION FOR PERCEPTUAL QUALITY EVALUATION IN VIDEO SEQUENCES

(71) Applicants: Telefonaktiebolaget L M Ericsson (PUBL), Stockholm (SE); Deutsche Telekom AG, Bonn (DE)

(72) Inventors: Martin Pettersson, Vallentuna (SE); Savvas Argyropoulos, Bonn (DE); David Lindero, Luleå (SE); Peter List, Bonn (DE)

(73) Assignees: TELEFONAKTIEBOLAGET LM ERICSSON (PUBL), Stockholm (SE); DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 16/504,776

(22) Filed: Jul. 8, 2019

(65) Prior Publication Data

US 2020/0007859 A1   Jan. 2, 2020

Related U.S. Application Data

(62) Division of application No. 14/351,483, filed as application No. PCT/EP2011/067741 on Oct. 11, 2011, now Pat. No. 10,349,048.

(51) Int. Cl.
   *H04N 17/00* (2006.01)
   *H04N 5/14* (2006.01)
   *H04N 5/93* (2006.01)

(52) U.S. Cl.
   CPC ......... *H04N 17/004* (2013.01); *H04N 5/147* (2013.01); *H04N 5/93* (2013.01)

(58) Field of Classification Search
   CPC ......... H04N 5/147; H04N 17/004; H04N 5/93
   (Continued)

(56) References Cited

U.S. PATENT DOCUMENTS

| 5,493,345 A | 2/1996 | Ishikawa et al. |
| 5,835,163 A | 11/1998 | Liou et al. |

(Continued)

FOREIGN PATENT DOCUMENTS

| CN | 1761331 A | 4/2006 |
| CN | 101087413 A | 12/2007 |

(Continued)

OTHER PUBLICATIONS

Feng et al. "Scene Change Detection Algorithm for MPEG Video Sequence" IEEE, 1996, pp. 821-824.

(Continued)

*Primary Examiner* — Loi H Tran
(74) *Attorney, Agent, or Firm* — Rothwell, Figg, Ernst & Manbeck, P.C.

(57) ABSTRACT

There are provided a plurality of methods for detecting a scene change in a streamed video, the streamed video comprising a series of pictures. An example method comprises calculating, for a plurality of positions, a difference between the costs of coding macro-blocks at the same position in successive pictures. The method further comprises identifying a new scene when the sum of the differences for a plurality of positions meets a threshold criterion. There is further provided a method of determining the perceptual impact of a packet loss on a streamed video the method comprising: identifying a packet loss; and determining if the lost packet contained information relating to a picture at the start of a new scene, wherein a new scene is detected using one of the methods disclosed herein.

3 Claims, 8 Drawing Sheets

(58) Field of Classification Search
USPC .......................................................... 386/241
See application file for complete search history.

(56) References Cited

U.S. PATENT DOCUMENTS

| | | | |
|---|---|---|---|
| 6,025,886 | A | 2/2000 | Koda |
| 6,094,234 | A * | 7/2000 | Nonomura ............. H04N 19/00 348/700 |
| 6,480,670 | B1 | 11/2002 | Hatano et al. |
| 6,993,182 | B2 | 1/2006 | Yang et al. |
| 8,265,145 | B1 | 9/2012 | Pejhan et al. |
| 2002/0031178 | A1 | 3/2002 | Isozaki |
| 2006/0093032 | A1* | 5/2006 | Shindo .................. H04N 19/142 375/240.03 |
| 2006/0109902 | A1 | 5/2006 | Yu et al. |
| 2006/0228035 | A1 | 10/2006 | Ishikawa |
| 2007/0133679 | A1 | 6/2007 | Yang et al. |
| 2009/0041114 | A1* | 2/2009 | Clark .................. H04L 43/0829 375/240.01 |
| 2009/0268097 | A1* | 10/2009 | Lin ......................... H04N 19/61 348/700 |
| 2010/0054333 | A1 | 3/2010 | Bing et al. |
| 2010/0082638 | A1 | 4/2010 | Marvasti |
| 2010/0142619 | A1 | 6/2010 | Suzuki et al. |

FOREIGN PATENT DOCUMENTS

| | | |
|---|---|---|
| CN | 101355708 A | 1/2009 |
| CN | 101547349 A | 9/2009 |
| CN | 101572815 A | 11/2009 |
| JP | 10-23421 A | 1/1998 |
| JP | 10-66087 A | 3/1998 |
| JP | 2002142219 A | 5/2002 |
| JP | 2006020118 A * | 1/2006 |
| JP | 2010-136292 A | 6/2010 |
| WO | 2003028236 A1 | 4/2003 |
| WO | 2009012297 A1 | 1/2009 |

OTHER PUBLICATIONS

Bozdagi et al. "Preprocessing Tool for Compressed Video Editing", IEEE, 1999, pp. 283-288.
Notice of Preliminary Rejection dated May 1, 2015, issued in Korean Patent Application No. 10-2014-7012699, 9 pages.
ITU-T Telecommunication Standardization Sector of ITU, Series J: Cable Networks and Transmission of Television, Sound Programme and other Multimedia Signals "Objective perceptual multimedia video quality measurement of HDTV for digital cable television in the presence of a full reference" International Telecommunication Union, J.341, 2011, 32 pages.
ITU-T Telecommunication Standardization Sector of ITU, Series J: Cable Networks and Transmission of Television, Sound Programme and other Multimedia Signals "Objective perceptual multimedia video quality measurement in the presence of a full reference" International Telecommunication Union, J.247, 2008, 108 pages.
ITU-T Telecommunication Standardization Sector of ITU, Series J: Cable Networks and Transmission of Television, Sound Programme and other Multimedia Signals "Objective perceptual video quality measurement techniques for digital cable television in the presence of a full reference" International Telecommunication Union, J.144, 2004, 156 pages.
Notice of Reasons for Rejection issued in corresponding application No. JP 2014-534946 dated Jun. 2, 2015, 6 pages.
European Communication dated May 20, 2016, issued in European Patent Application No. 11768004.1, 6 pages.
Arman et al. "Image Processing on Compressed Data for Large Video Databases" Proceedings of the ACM International Conference on Multimedia, 1993, pp. 267-272.
Chinese Office Action dated Nov. 30, 2016, issued in Chinese Patent Application No. 201180074123.4, 7 pages.
Extended European Search Report dated May 11, 2017, issued in European Patent Application No. 16204964.7, 9 pages.
Chinese Search Report dated Mar. 8, 2018, in Chinese Application No. 201180074123.4, 3 pages.
English Translation of Japanese Publication 2010-136292, Jun. 2010.

* cited by examiner

Fig. 3A

|   |   |   |   |   |
|---|---|---|---|---|
|   |   |   |   |   |
|   | △ |   |   |   |
|   | × | △ | ○ |   |
| × |   | △ |   |   |
| × |   |   |   |   |

301

|   |   |   |   |   |
|---|---|---|---|---|
|   |   |   |   |   |
|   | △ |   |   |   |
|   | × | △ | ○ |   |
| × | × | △ |   |   |
| × |   |   |   |   |

302

|   |   |   | △ | △ |
|---|---|---|---|---|
|   |   |   |   |   |
|   |   |   | × | × |
|   | △ |   | × |   |
|   |   | × | ○ |   |

303

Key:
- ○  Intra, including sub-blocks
- □  Intra 16 x 16
- △  Inter, Including sub-blocks
- ☐  Inter 16 x 16
- ×  Skip

Fig. 3B

| 0 | 0 | 0 | 0 | 0 |
|---|---|---|---|---|
| 0 | 35 | 35 | 0 | 0 |
| 0 | 0 | 0 | 0 | 0 |
| 0 | 25 | 0 | 0 | 0 |
| 0 | 0 | 0 | 0 | 0 |

| 301 - 302 |

| 0 | 0 | 0 | 35 | 35 |
|---|---|---|---|---|
| 0 | 35 | 0 | 0 | 0 |
| 0 | 25 | 35 | 100 | 0 |
| 60 | 25 | 35 | 25 | 25 |
| 25 | 0 | 25 | 75 | 0 |

| 302 - 303 |

SCENE CHANGE DETECTION FOR PERCEPTUAL QUALITY EVALUATION IN VIDEO SEQUENCES

CROSS REFERENCE TO RELATED APPLICATION(S)

This application is a divisional of U.S. application Ser. No. 14/351,483, filed Aug. 21, 2014, now U.S. Pat. No. 10,349,048, which is a 35 U.S.C. § 371 National Phase Entry Application from PCT/EP2011/067741, filed Oct. 11, 2011, designating the United States, the disclosures of each of the above-referenced applications are incorporated herein in their entirety by reference.

TECHNICAL FIELD

The present application relates to a plurality of methods of detecting a scene change in a streamed video; a method of determining the perceptual impact of a packet loss on a streamed video; a method of determining the perceptual impact of the occurrence of a new scene in a streamed video, and a computer-readable medium.

BACKGROUND

Television content or video content can be transmitted across an IP network from a content provider to a device which is used by an end user. The device may be a personal computer, a wireless communications device, a set-top box, a television with set-top box functionality built in, a smart TV, or a smart set-top box. The television content or video content may have audio content associated therewith which is usually transmitted therewith. Where the transmission occurs in "real time", meaning that the content is displayed before the transmission is complete, this is referred to as streaming.

Video streaming across communications networks is becoming increasingly common. To ensure the end-to-end quality of video streamed over a communications network, the network operator and the video service provider may use video quality models. A video quality model generates an objective assessment of video quality by measuring artifacts or errors from coding and transmission that would be perceptible to a human observer. This can replace subjective quality assessment, where humans watch a video sample and rate its quality.

Video quality models have been known for some time in the academic world but it is only recently that their use has been standardized. Perceptual video quality models are described in the International Telecommunications Union (ITU) standards J.144, J.247 and J.341. Perceptual models have the advantage that they can use pixel values in the processed video to determine a quality score. In the case of full-reference models (as in the ITU standards mentioned above) a reference signal is also used to predict the degradation of the processed video. A big disadvantage of perceptual models is that they are computationally demanding and not suitable for deployment on a large scale for the purposes of network monitoring.

A more light-weight approach is therefore currently being standardized in ITU-T SG12/Q14 under the working name P.NAMS. The model takes as its input network layer protocol headers and uses these to make a quality estimation of the transmitted video. This makes the model very efficient to implement and use, but on its own the quality estimation of the transmitted video is rather coarse. Therefore ITU-T SG12/Q14 will also standardize a video bit stream quality model under the working name P.NBAMS. This model uses not just the network layer protocol headers but also the encoded elementary stream or "bit stream". Using both sets of inputs has the advantage that it will be fairly light-weight at the same time as obtaining a better estimate of the quality of the video as compared to the P.NAMS model.

Block based coding is the dominating video encoding technology with codec standards such as H.263, MPEG-4 Visual, MPEG-4 AVC (H.264) and the emerging H.265 standard being developed in the ITU Joint Collaborative Team on Video Coding (JCT-VC). Block based coding uses different types of pictures (which employ different types of prediction) to be able to compress the video as efficiently as possible. Intra pictures (I-pictures) may only be predicted spatially from areas in the picture itself. Predictive pictures (P pictures) are temporally predicted from previous coded picture(s). However, some macro-blocks in P-pictures may be intra-encoded. Bidirectional predictive pictures (B-pictures) are predicted from both previous and following pictures. An I-picture with the restriction that no picture prior to that may be used for prediction is called an Instantaneous Decoding Refresh (IDR) picture. I and IDR pictures are often much more expensive to encode in terms of bits than the P-pictures and B-pictures.

To increase error resilience in error prone communications networks, I or IDR pictures are inserted periodically to refresh the video. I or IDR pictures are also inserted periodically to allow for random access and channel switching. Moreover, I or IDR pictures are inserted when the cost (both in terms of induced distortion and bit allocation) of encoding a picture as P-picture is greater than the cost of encoding it as an I or IDR picture. This occurs when the spatial redundancy of the picture is higher than the temporal redundancy of the picture with its reference pictures. This typically happens when the picture under consideration is a scene change, also known as a scene cut, which means that the depicted scene is quite different from its previous picture. Whether the forced intra pictures should be inserted in time is not defined by the video coding standard (which defines only the decoding procedure), but it is up to the encoder to decide.

On average, television content typically contains a transition between scenes, known as a scene change, every 3-5 second. Scene changes may occur instantly between two pictures or be faded over several pictures. Because it is usually the case that no good temporal prediction can be made from one side of a scene change to another, a smart encoder will often try to align a scene cut with an I- or IDR-picture.

WO 2009/012297 describes a method and system for estimating the content of frames in an encrypted packet video stream without decrypting the packets by exploiting information only from the packet headers. An I-frame is denoted as the start of a new scene if the length of the prior Group of Pictures (GOP) is abnormally short and the penultimate GOP length is equal to its maximum value. However, the major shortcoming with this method is that the scene changes which occur in normal GOP lengths cannot be identified. For example, if the normal GOP length is 25 frames, then a scene change which occurs in frame number 25, 50, 75,100, etc. cannot be detected. Moreover, a shorter GOP length does not necessarily mean that the picture under consideration is a scene change, thus leading to many false positives.

SUMMARY

There is provided herein a plurality of scene change detection methods which are suitable for use in a quality assessment model. Further, there is provided a quality assessment model which employs scene change detection.

Packet losses occurring during a scene change are often much more visible than packet losses occurring in the middle of a scene. Accordingly, there is provided a quality detection model which uses scene change detection in combination with detection of errors such as packet losses. However, a scene change detection method for the purposes of a quality assessment model must be very accurate as any error in scene change detection is likely to be amplified in the quality assessment.

FIGS. 1A and 1B illustrate the relative impact of a data loss in an I-picture in two circumstances. FIG. 1A shows the data loss in an I-picture at the start of a new scene, whereas FIG. 1B shows a similar loss but at the I-picture in the middle of a scene. In FIG. 1A picture 110 features a "missing section" 115, where the decoder has not received data relating to this part of the new scene and so uses the corresponding section from a picture from the previous scene. Here, the new scene is of players on a field, whereas the previous scene is of a crowd. In FIG. 1B the data loss occurs during a scene showing players on the field and so the data loss is far less noticeable. The detail of the upper player on the right hand side of picture 120 is distorted, but the data loss is barely perceptible.

Moreover, scene changes have an impact on the quality of video signals even if no transmission errors occur. Typically, sequences with scene changes have lower quality because they represent more complex content which is in general more costly to encode. Additionally, the I-pictures which are at the start of a new scene usually are (or at least behave as if they are) IDR pictures. This deteriorates the compression efficiency because of the limited number of reference pictures.

There is provided a method of detecting a scene change in a streamed video, wherein the streamed video comprises a series of pictures. The method comprises calculating, for a plurality of positions, a difference between the cost of coding macro-blocks at the same position in successive pictures. The method further comprises identifying a new scene when the sum of the differences for a plurality of positions meets a threshold criterion.

Where the streamed video is encoded, the above method may operate on the encoded bit stream. The method does not require the decoding of the streamed video.

The positions for which differences are calculated may be: pixel positions; sub-block positions; and/or macro-block positions. The pixel positions may comprise the positions of individual pixels or the positions of groups of pixels.

The cost of coding a macro-block may be determined according to macro-block type. The macro-block type may comprise one of: skip; inter-coded macro-block as one partition; inter-coded macro-block subdivided into multiple partitions; intra-coded macro-block as one partition; and intra-coded macro-block subdivided into multiple partitions. A historical average coding cost of each macro-block type may be used to assign a coding cost to a particular macro-block using only the particular macro-blocks type.

The method may further comprise applying motion compensation, whereby the difference between the cost of coding macro-blocks for pixels at the same position in successive pictures is calculated for the pixel positions after motion compensation has been applied. This means that the difference between pixel values is calculated between a location of the current picture and its motion-compensated location in the reference (previous) picture.

The method may further comprise including an offset between the positions in successive pictures. For each of a plurality of offset values, a sum of the differences for a plurality of positions may be calculated to obtain a plurality of difference totals corresponding to the plurality of offset values. The method may further comprise comparing the minimum of the plurality of difference totals to the threshold criterion. This allows for misalignment of otherwise similar macro-blocks, for example due to a panning motion between successive pictures.

The method may further comprise identifying a new scene when the sum of the differences for a plurality of pixel positions is either higher than a maximum threshold value or lower than a minimum threshold value. At least one threshold value may be determined by taking a weighted average of differences calculated between a predetermined number of the immediately preceding pictures, wherein the differences between the more recent pictures are given a greater weight. This is sometimes referred to as using a sliding window.

There is also provided an apparatus for detecting a scene change in a streamed video, the streamed video comprising a series of pictures. The apparatus comprises a processor arranged to calculate, for a plurality of positions, a difference between the cost of coding macro-blocks at the same position in successive pictures. The apparatus further comprises a scene change detector arranged to identify a new scene when the sum of the differences for a plurality of positions meets a threshold criterion.

There is further provided a method of detecting a scene change in a streamed video, the streamed video comprising a series of pictures. The method comprises calculating, for a plurality of positions, a difference between pixel values at the same position in successive pictures. The method further comprises applying a weighting to the difference, the weighting dependent upon the macro-block type associated with the position. The method further comprises identifying a new scene when the sum of the weighted differences for a plurality of positions exceeds a threshold value.

The method may further comprise applying motion compensation, and wherein the difference between the cost of coding macro-blocks for pixels at the same position in successive pictures is calculated for the pixel positions after motion compensation has been applied. This means that the difference between pixel values is calculated between a location of the current picture and its motion-compensated location in the reference (previous) picture.

There is also provided an apparatus for detecting a scene change in a streamed video, the streamed video comprising a series of pictures. The apparatus comprises a pixel information analyzer arranged to calculate, for a plurality of positions, a difference between pixel values at the same position in successive pictures. The apparatus further comprises a processor arranged to apply a weighting to the difference, the weighting dependent upon the macro-block type associated with the position. The apparatus further still comprises a scene change detector arranged to identify a new scene when the sum of the weighted differences for a plurality of positions exceeds a threshold value.

There is further provided a method of detecting a scene change in a streamed video, the streamed video comprising a series of pictures. The method comprises determining the encoded size of a picture. The method further comprises determining the picture type of the picture. The method further still comprises identifying a new scene when the encoded picture size exceeds a threshold for the detected picture type.

The picture type may be determined according to information extracted from packet headers of the streamed video. The picture type may be determined from timestamp information contained in the RTP or MPEG2-TS PES header.

The picture type may comprise one of: intra-coded; uni-directional predictive pictures; and bi-directional predictive pictures. The bi-directional predictive pictures may be reference and/or non-reference pictures.

There is also provided an apparatus for detecting a scene change in a streamed video, the streamed video comprising a series of pictures. The apparatus comprises a processor arranged to determine the encoded size of a picture, and to determine the picture type of the picture. The apparatus further comprises a scene change detector arranged to identify a new scene when the encoded picture size exceeds a threshold for the detected picture type.

There is further provided a method of detecting a scene change in a streamed video, the streamed video comprising a series of pictures. The method comprises determining the encoded size of a picture. The method further comprises determining the picture type according to the encoded size of the picture. The method further comprises calculating, for a plurality of pixel positions, a difference between pixel values at the same position in successive pictures. The method further comprises calculating a measure of difference between successive pictures by summing the pixel differences. The method further comprises applying a weighting to the measure of difference between successive pictures, the weighting dependent upon the picture type. The method further comprises identifying a new scene when the weighted difference exceeds a threshold value.

The picture type may comprise one of: intra-coded; uni-directional predictive pictures; and bi-directional predictive pictures. The bi-directional predictive pictures may be hierarchical and/or non-hierarchical.

There is also provided an apparatus for detecting a scene change in a streamed video, the streamed video comprising a series of pictures. The apparatus comprises a processor arranged to determine the encoded size of a picture, and to determine the picture type according to the encoded size of the picture. The processor is further arranged to calculate: a difference between pixel values at the same position in successive pictures for a plurality of pixel positions; and a measure of difference between successive pictures by summing the pixel differences. The processor is further arranged to apply a weighting to the measure of difference between successive pictures, the weighting dependent upon the picture type. The apparatus further comprises a scene change detector arranged to identify a new scene when the weighted difference exceeds a threshold value.

There is further provided a method of determining the perceptual impact of a packet loss on a streamed video, the streamed video comprising a series of pictures. The method comprises identifying a packet loss. The method further comprises determining if the lost packet contained information relating to a picture at the start of a new scene, wherein a new scene is detected using the method of detecting a scene change according to any of the above described methods.

There is further provided a computer-readable medium, carrying instructions, which, when executed by computer logic, causes said computer logic to carry out any of the methods described above.

BRIEF DESCRIPTION OF THE DRAWINGS

A scene change detection method and a quality assessment model will now be described, by way of example only, with reference to the accompanying drawings, in which:

FIGS. 3A and 3B illustrate picture comparison using macro-block types;

DETAILED DESCRIPTION

There are presented herein four different types of scene change detection for use in video quality models under the following four sets of circumstances:

i) using features extracted or computed from the encoded video bit stream when decoding of pixel data is either not possible or not allowed;

ii) using features extracted or computed from the video bit stream when decoding of pixel data is allowed;

iii) using packet header information of encoded video signals; and iv) using packet header information and the pixel data obtained by decoding the video bit stream.

A model having access to decoded pixel data will potentially be able to make a more accurate estimation of the perceived video quality. However, this comes at the cost of higher complexity with increased demand for resources including memory and processing power.

The four different modes of operation presented herein are either specified from the complexity requirements of a video quality assessment module or from the lack of specific information due to encryption of the video signal. For example, if the video quality measurement is deployed in a network location with limited power resources or if the video signal is encrypted, then mode (iii) would be appropriate. If the model is deployed in a decoding device at the end user premises and the video signal is encrypted then the invention can additionally use the pixel data from the reconstructed pictures (which can be, for example, captured from the end user device) and mode (iv) would be appropriate. If the video signal is not encrypted then the system can exploit the features of the video bit stream as described in modes (i) and (ii) depending on the complexity specifications and requirements.

Each of the modes will be described in turn.

(i) Using Features Extracted from the Encoded Video Stream.

This method of detecting a scene change in a streamed video comprises: calculating, for a plurality of positions, a difference between the cost of coding macro-blocks at the same position in successive pictures; and identifying a new scene when the sum of the differences for a plurality of positions meets a threshold criterion.

Figure 1A:
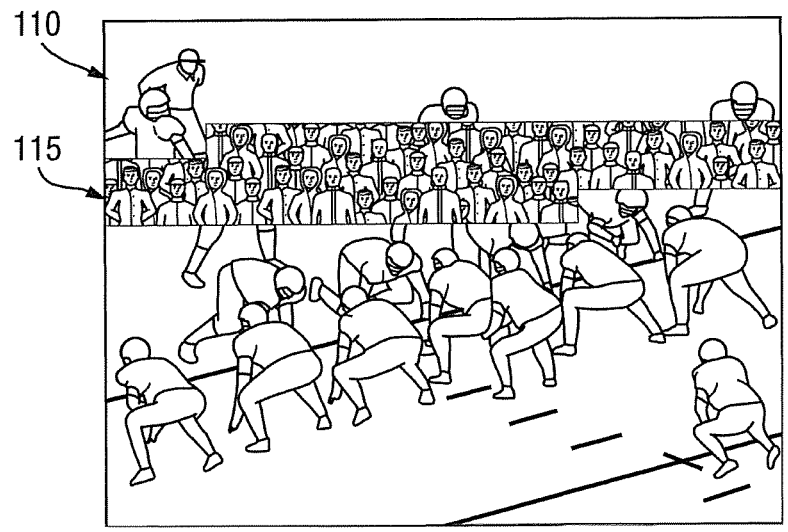
FIGS. 1A and 1B illustrate the relative impact of a data loss in an I-picture in two circumstances.
Figure 1B:
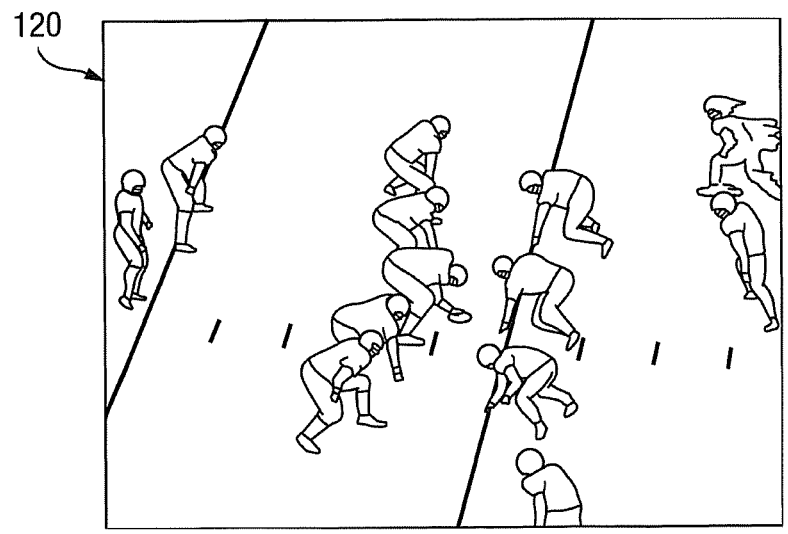
Figure 2:
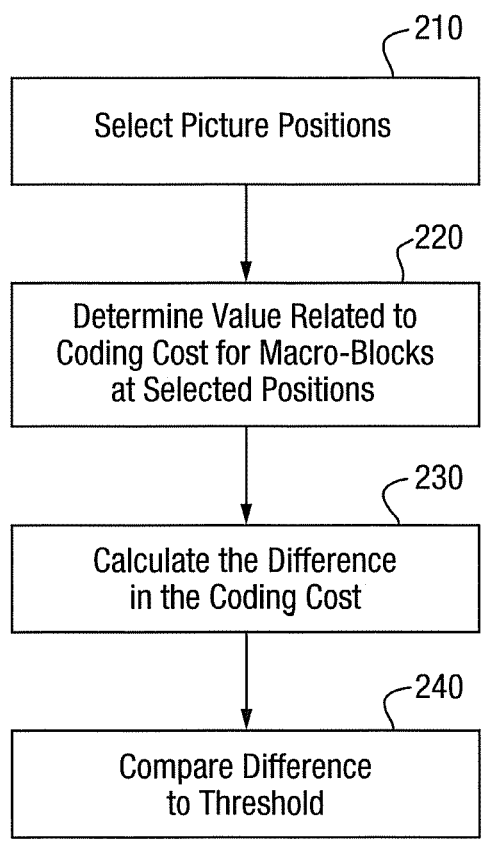
FIG. 2 is a flow diagram showing the method of identifying a scene change using features extracted from the encoded video stream.

This method, as applied to two successive pictures in a streamed video is illustrated by the flow diagram in FIG. 2. At 210 the picture positions that will be compared are selected. For some implementations, every picture location may be compared, but for others a sub-set is selected either according to a predetermined or even a random pattern. At 220, a value relating to the cost of coding a macro-block at each of the selected picture positions, in both of the pictures is determined. At 230, the difference in the coding cost between the two pictures is calculated at each of the selected positions. These differences are summed and the total difference is compared to a threshold value. If the total difference exceeds the threshold value then it is determined that a scene change has occurred.

This scene change detection method may be employed when a quality assessment model detects one of the following:
 the loss of one or more pictures;
 the loss of part of a picture, the picture being encoded as an I-picture or an IDR picture;
 the loss of a part of a picture, wherein the proportion of intra-coded macro-blocks in the picture exceeds a threshold, such that the picture has a similar impact to an I-picture or IDR picture.

The method may be applied to two pictures, one occurring prior to a data loss, the other after it. The method comprises making a comparison between two pictures. This allows the determination of whether the loss has occurred during a scene change. However, a scene change detection method could also be applied even if no losses have occurred.

An indication of the cost of coding a macro-block at a position in a picture can be determined using: motion vectors, macro-block types, number of bits used for macro-block coding, and/or quantization values.

Where motion vectors are used to determine the cost of coding a macro-block, the direction and size of the motion vector for the macro-block are used. The greater the size of the motion vector the greater the coding cost. The direction of the motion vector may also have an impact on the coding cost. This approach can detect many cases where a scene change occurs. However, for very static scenes the motion vector only approach will not be able to detect scene changes (i.e. scene changes from one static scene to another static scene are difficult to detect by looking at motion vectors).

The coding cost can also be determined by analyzing the complexity of particular areas of the pictures. The complexity can be measured by looking at the number of used bits or the type of macro-block that is used in a particular macro-block position. For macro-block types, each type of macro-block can be assigned a number according to the table below, where expensive macro-blocks are assigned higher values.

TABLE 1 macro-block type value assignment for picture matching.

| Macro-block type | Assigned value |
| --- | --- |
| Infra macro-block including sub-blocks | 100 |
| Intra 16 × 16 | 75 |
| Inter macro-block including sub-blocks | 60 |
| Inter 16 × 16 | 25 |
| Skip | 0 |

The picture comparison illustrated in FIGS. 3A and 3B uses macro-block types, with a scoring system corresponding to table 1. The size of each picture in this example is only 5×5 macro-blocks for illustrative purposes. In practice, a typical picture size is often between QCIF video format (11×9 macro-blocks) and full HD video (120×68 macro-blocks). In FIG. 3A the macro-block type is illustrated by a symbol: Intra macro-block including sub-blocks by a circle; Intra 16×16 by a square; Inter macro-block including sub-blocks by a triangle; Inter 16×16 by a blank; Skip by a cross. FIG. 3A shows three successive pictures, 301, 302, 303.

FIG. 3B shows difference maps for successive pairs of pictures in FIG. 3A. The first difference map contains the absolute difference per macro-block value between pictures 301 and 302. The second difference map contains the absolute difference per macro-block between pictures 302 and 303. The average difference in the first difference map is 3.8 and in the second difference map it is 22.4. The distributions of macro-block types are the same for the three pictures in the example but the differences are very different due to the positions of the complexity. The complexity in pictures 301 and 302 is in very similar positions, whereas the complexity in pictures 302 and 303 is in very different positions.

The above method can be extended to allow for a misalignment of one or two macro-blocks. This can compensate for certain movements such as a camera panning and can make the result more accurate. Even if the two pictures to be compared are very similar when it comes to for instance the macro-block type pattern, they may still get a high differential value if all blocks in one of the pictures are shifted slightly (for instance due to camera motion). Allowing for a misalignment of one or two blocks would mean that the calculation of the differences between the blocks would consider the value of the surrounding blocks. In practice this could mean that the difference for the block would be the minimum of the plurality of difference values obtained by comparing the block to all surrounding blocks.

$$\mathit{diff}_{B(m,n)} = \min(|val_{B(m,n)} - val_{A(m+x,n+y)}|), \quad \begin{array}{l} x \in -1, 0, 1 \\ y \in -1, 0, 1 \end{array}$$

The difference for a macro-block at a position of picture 302 is the minimum of the difference values (e.g. Table 1) for the macro-block at position (m+x, n+y) of picture 301, m and n indicating the position of the macro-block in picture 301 and x and y indicating an offset between the macro-block position of pictures 301 and 302 in the horizontal and vertical directions respectively, where x and y take any of the values of (−1,−1), (−1,0), (−1,1), (0,−1), (0,0), (0,1), (1,−1), (1,0), and (1,1).

Further, the above methods can be extended to take into account motion compensation. In contrast to I-pictures which only may predict from itself, P-pictures and B-pictures predict from previous (and sometimes future) pictures. Prediction from other pictures can be done by just predicting from the exact corresponding pixel positions in the other picture, or a motion vector can be applied to predict from a different spatial position in the other picture. This is especially useful when there is natural motion between the two pictures.

Motion compensation can be applied here with the aim of aligning the blocks to be compared according to the motion vectors before calculating the difference. For instance, consider the top-most inter macro-block including sub-blocks in picture 302 of FIG. 3A marked by a triangle. Top left pixel of the picture has pixel position (0,0), and each macro-block comprises 16×16 pixels. The subject macro-block has top left pixel in pixel position (16, 16). If this is derived from a macro-block in the previous picture in the macro-block position adjacent to it shifted one to the right, then it would have a motion vector mv(x,y)=(16,0) pointing at pixel position (32, 16) in picture 301. By performing a motion compensation before calculating a difference we would end up with a difference of 0 instead of 35 for this macro-block.

Of course, motion vectors do not necessarily have to be aligned with the size of macro blocks, but could point at any pixel (even half- and quarter pixel positions in H.264). To accommodate for this, the method may select the block closest to the pixel position that the motion vector points at, or the method may perform a weighting of the four blocks that intersect with the predicted block. For example, say that the motion vector mv(x,y)=(−12,3) is used in encoding the same subject macro-block in picture 302 (the top-most macro-block marked by a triangle). The prediction would then be taken from a 16×16 block with top left pixel in position (4,19) and the weighting done from the macro blocks in position (0,16), (16,16), (0,32) and (16, 32) from picture 301. The weighting may be calculated as follows:

Value for block (16, 16) in
$$302 = 25 \cdot \frac{156}{16 \cdot 16} + 25 \cdot \frac{52}{16 \cdot 16} + 25 \cdot \frac{36}{16 \cdot 16} + 0 \cdot \frac{12}{16 \cdot 16} = 23.8$$

Yet another way to get more stable results of the matching of the parameters is to average over several pictures using a sliding window approach. Dividing the average difference with the average difference of the previous picture will make it possible to detect scene changes using a static threshold of n and 1/n. We could for instance have the two series of average absolute differences below:

| Sequence a: | 3.3 | 2.3 | 3.8 | 22.4 | 20.3 | 21.0 |
| Sequence b: | 8.4 | 7.3 | 7.8 | 1.2 | 2.2 | 2.0 |

Dividing the values with the previous value yields:

| Sequence a: | 0.7 | 1.7 | 9.7 | 0.9 | 1.0 |
| Sequence b: | 0.9 | 1.1 | 0.2 | 1.8 | 0.9 |

Using n=3 means that a value above 3 or below 0.33 indicates that a scene change has occurred. In the examples above we detect a new scene at the fourth picture for both sequences.

In alternative embodiments, the assigned values according to macro-block type in table 1, as used in the above methods, are replaced by the number of bits used for coding each macro-block.

In yet further embodiments, the differences in quantization parameter (QP) may also be indicative of a scene change if the QP suddenly drops or increases over one picture.

The quantization parameter (QP) determines how much the differences between two blocks should be quantized. Each coefficient of the transformed pixel differences are quantized to one of the quantization steps determined by the QP and corresponding look-up tables. A high QP means lower fidelity of the quantization steps resulting in low quality and a low QP means higher fidelity of the quantization steps giving a higher quality. QP is thus a good indicator of the quality degradation due to encoding and is frequently used by bitrate control algorithms to maximize the quality given the available bitrate. QP can be set individually for each macro block, but as it is relatively expensive to change the QP back and forth for each macro block, large QP differences are usually set per picture.

(ii) Using Features Extracted from the Video Stream and Decoded Pixel Data.

The above methods for detecting a scene change from video stream information can be extended when the decoded pixel data is available for analysis. This may be the case in a set-top-box, which can decode the encrypted video bit stream in order to generate the pixel data and display the streamed video. Of course, such decoding may be performed at other nodes in the distribution network, though this is not normally done due to the processing requirements, and may not be possible if the video stream is encrypted.

There is provided a method of detecting a scene change in a streamed video, the streamed video comprising a series of pictures, the method comprising: calculating, for a plurality of positions, a difference between pixel values at the same position in successive pictures; applying a weighting to the difference, the weighting dependent upon the macro-block type associated with the position; and identifying a new scene when the sum of the weighted differences for a plurality of positions exceeds a threshold value.

This is based on the principle that the pixel values of two consecutive pictures which belong to the same scene will differ slightly (since the depicted scene undergoes a small translation, rotation, or scaling from one picture to another) while the difference in pixel values is expected to be much higher if the two consecutive pictures belong to different scenes (i.e, if there is a scene change between the two examined pictures).

Moreover, the motivation of including the macro-block type as a weighting factor stems from the fact that it provides an indication of the predictability and the temporal redundancy between the specific location of the picture under consideration and its reference picture(s). In the following, the solution is described for the macro-block encoding modes specified in the H.264/AVC video coding standard. However, the same principles may be applied to other block-based video coding standards.

A macro-block encoded in SKIP mode, is likely to belong to a picture which resembles its reference picture and, therefore, is not a scene change. Similarly, the INTER-16×16 encoding mode is typically selected for the macro-blocks that represent uniform regions which can be very efficiently temporally predicted by previous picture(s). Hence, it is again evident that these macro-blocks are less likely to appear in a frame which is a scene change.

On the other hand, the INTRA-4×4 encoding mode is usually selected for those macro-blocks that exhibit very low temporal redundancy with their temporal and spatial predictors. Therefore, these macro-blocks are more likely to appear in a frame which is a scene change.

Accordingly, the difference in pixel values of subsequent pictures is weighted according to the macro-block type. In particular, where a macro-block is split into sub-blocks, it is expected that collocated pixel values will have changed from the previous picture to the current picture, and so pixel differences associated with such macro block types are given an increased weighting. Skip macro-blocks (and to slightly lesser extent full-size intra and inter macro-blocks) are expected to take very similar collocated pixel values between the current frame and the previous frame, and so any pixel value differences for these macro-blocks is given a lower weighting.

Figure 4:
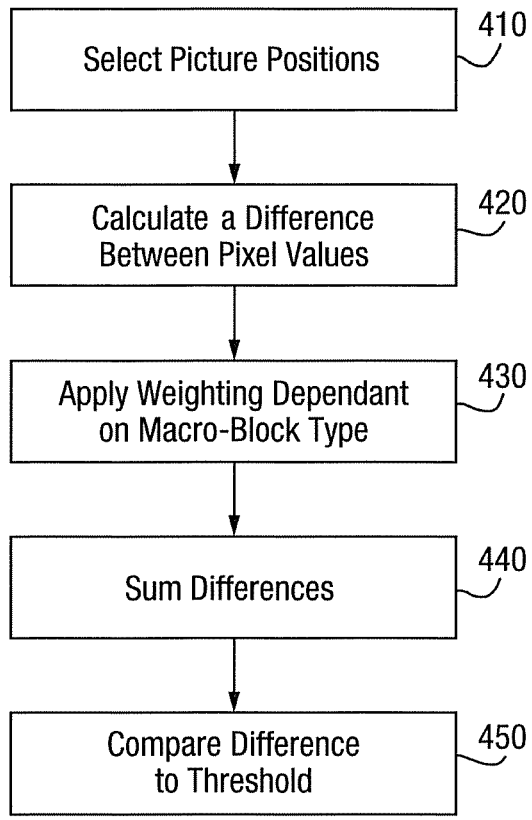
FIG. 4 is a flow diagram showing the method of identifying a scene change using features extracted from the video stream and decoded pixel data.

A flow chart illustrating this method, as applied to two successive pictures in a streamed video, is shown in FIG. 4. At 410 the picture positions that will be compared are selected. For some implementations, every picture location may be compared, but for others a sub-set is selected either according to a predetermined or even a random pattern. At 420, the difference in the pixel values between the two pictures is calculated at each of the selected positions. At 430, a weighting is applied to the calculated differences, the weighting dependent upon the macro-block type used to encode the pixel values of each position in the latter of the pictures. At 440, these weighted differences are summed. At 450, the total difference is compared to a threshold value. If the total difference exceeds the threshold value then it is determined that a scene change has occurred.

The weighted difference between pixel values in collocated position in two consecutive pictures is examined. More specifically, let $P_{m,n}^{k}$ denote the pixel value at the m-th row and n-th column of the k-th picture. Then, the difference between the picture under consideration and the previous picture is computed as:

$$d_{m,n}^{k} = P_{m,n}^{k} - P_{m,n}^{k-1}$$

As an alternative, this method could be extended such that the difference is computed between the current picture and the previous motion compensated picture to account for the movement between the successive pictures. Moreover, any other distortion metric could be used, such as, for example, the sum of absolute differences or the sum of squared differences.

Either using the difference, or the motion compensated difference, the difference of pixels in the current picture as compared to the previous picture is weighted based on the macro-block type that the pixels in the current picture belong to. An example of the weights assigned to each macro-block type is provided in Table 2.

TABLE 2

Weights based on macro-block type

| Macroblock type | Weight $w_t$ |
| --- | --- |
| Skip | 0.2 |
| Intra 16 × 16 | 0.9 |
| Intra 8 × 8 | 0.9 |
| Intra 4 × 4 | 1.0 |
| Inter 16 × 16 | 0.4 |
| Inter 16 × 8 | .05 |
| Inter 8 × 16 | 0.5 |
| Inter 8 × 8 (with no subtypes) | 0.6 |
| Inter 8 × 8 (with subtypes) | 0.7 |

Thus, for every picture the following weighted sum is computed:

$$D^k = \sum_{m=1}^{M} \sum_{n=1}^{N} w_t \cdot d_{m,n}^k$$

Subsequently, the weighted sum is compared to a threshold $T_{scene}$ to determine whether the examined picture is the start of a new scene or not. if the computed difference exceeds the threshold, then the current picture is denoted as a scene change.

(iii) Using Packet Header Information of Encoded Video Signals.

In some cases, along the transmission path of the streamed video, the only available information to determine the scene changes is the packet headers which transport the video signal. In this case, the size and the type of each picture can be computed by extracting information from the packet headers.

Accordingly there is provided a method of detecting a scene change in a streamed video, the streamed video comprising a series of pictures, the method comprising: determining the encoded size of a picture; determining the picture type of the picture; and identifying a new scene when the encoded picture size exceeds a threshold for the detected picture type.

Figure 5:
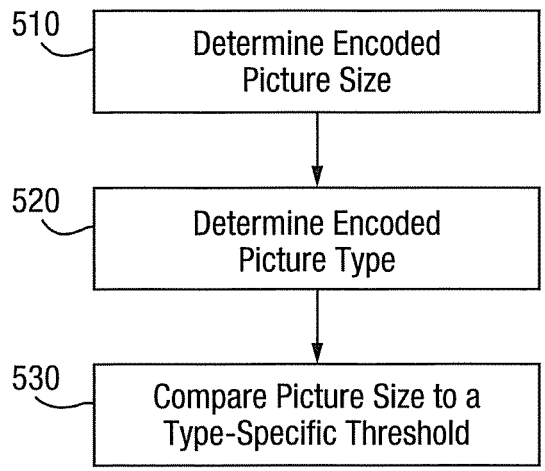
FIG. 5 is a flow diagram showing the method of identifying a scene change using packet header information of encoded video signals.

The method is illustrated by a flow chart in FIG. 5. At 510 the encoded picture size is determined from the packet headers of the video bit stream. At 520 the picture size is used to determine the picture type. This is possible because the sizes of different picture types fall within identifiable ranges, as will be explained below. Then, at 530, the picture size of an I-picture is compared to a threshold criterion, the threshold criterion dependent upon the determined picture type. A scene change is detected when the size of one picture type makes a significant change. A scene change may be detected when the size of one picture type exceeds a threshold value. The threshold value may be: predetermined; predetermined and dependent on the encoding parameters of the video stream; or determined according to the sizes of recently received pictures of one or more types.

Figure 6:
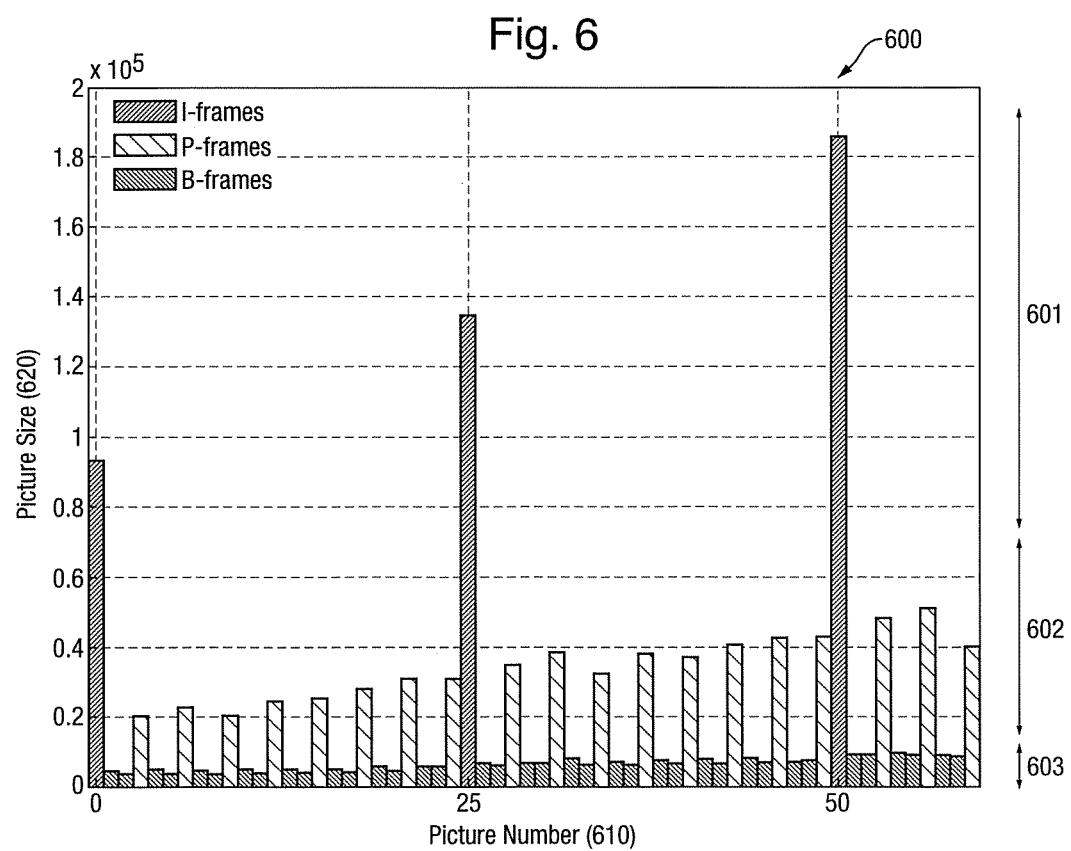
FIG. 6 illustrates an example of how the picture type is determined from the size of each picture.

The picture type is determined from the size of each picture. FIG. 6 illustrates an example of how this can be done. Chart 600 shown in FIG. 6 shows the picture size for a series of 60 pictures, numbered 0 to 59. Picture number is shown on the horizontal axis 610, picture size is shown in the vertical axis 620. I-pictures, P-pictures and B-pictures are shown according to the key at the top left corner of chart 600. As shown in FIG. 6, I-pictures are larger than P-pictures, and P-pictures are larger than B-pictures. As evident from FIG. 6, the encoded size of the I-pictures fall within a first range 601, the encoded sizes of the P-pictures fall within a second range 602, and the encoded sizes of the B-pictures fall within a third range 603.

Alternatively, the picture type may be determined from packet header information using both their size and the GOP pattern of the examined video bit stream. Such a method is described in European Patent Application Number 2010171431.9, incorporated herein by reference. The GOP pattern is estimated by pattern matching of the encountered frame sizes in each GOP to typical predefined GOP patterns. With the knowledge of this estimated GOP pattern the type of every subsequent frame can be estimated.

This alternative picture type determination method comprises:

a. capturing the frame sizes (in bytes) of every video frame subsequent to an initial Intra-frame, I-frame, to obtain an array of frame sizes;

b. converting, after a number of frames, the array of frame sizes into an array of zeros and ones, where zero stands for small frames size, as assumed for bi-directional frames, B-frames, and one stands for large frame sizes, as assumed for predicted frames, P-frames;

c. matching the array of zeros and ones obtained in (b) to a number of predefined patterns of binaries, said predefined patterns of binaries depicting possible GOP structures;

d. converting the result of said matching in step (c) to form a single score value; and e. determining the particular pattern of the number of predefined patterns of binaries having the best score value, according to a predefined metric.

This alternative method does not determine the frame type based on the frame size of a single frame, but rather considers a plurality of frames and their respective frame sizes to match them with predefined patterns, and from that matching determines the structure of the GOP and thus the type of each picture.

FIG. 6 is merely an illustration; the first, second and third ranges depend upon a number of factors, which include the video resolution, the encoding parameters, and the spatio-temporal complexity of the content. However, the relative difference between the three types of picture is a characteristic of this block-based coding and the ranges can be derived from the immediately preceding pictures.

Figure 7:
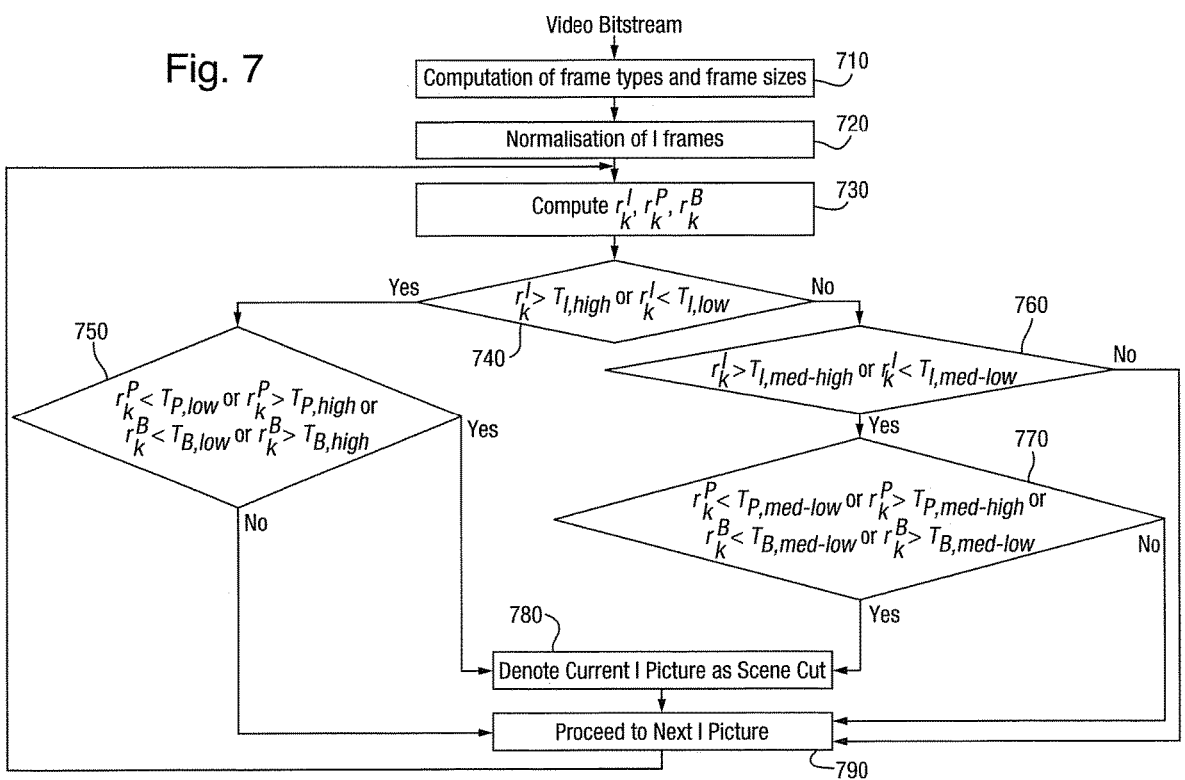
FIG. 7 is a flow diagram of a scene change detection procedure embodying the above described method.

The following is a detailed explanation of a scene change detection procedure embodying the above described method. This procedure is illustrated by the flow diagram in FIG. 7. Typically, a new scene will start with an I-picture, and so this procedure is applied to each detected I-picture in a video stream to determine whether it is the start of a new scene.

The video bit stream is received and at 710 the computation of picture size and picture type is performed as described above. At 720, the size of the I-picture is normalized based on the sizes of the previous P-pictures to reflect the content changes in the most recent pictures. The new normalized size I_k^norm of the I-picture is given by:

$$\tilde{F}_k^I = F_k^I \cdot \text{scale\_factor}_k$$

where $F_k^I$ denotes the size of the k-th I-picture, and the scaling factor $\text{scale\_factor}_k$ is given by:

$$\text{scale\_factor}_k = \frac{\text{median}(F_{k-n}^P, \ldots, F_{k-1}^P)}{\text{mean}(F_{k-M}^P, \ldots, F_{k-1}^P)}$$

where $F_k^P$ is the picture size of the k-th P picture in the current GOP and M is the total number of P pictures in the current GOP.

At 730, the ratio of the picture size of the current I-picture and the normalized picture size of its previous I-picture is computed:

$$r_k^I = \frac{\tilde{F}_{k-1}^I}{F_k^I}$$

Also, the ratio of the P-picture sizes before and after the current I-picture is computed:

$$r_k^P = \frac{\text{mean}(F_{k-n}^P, \ldots, F_{k-1}^P)}{\text{mean}(F_{k+1}^P, \ldots, F_{k+n}^P)}$$

and the ratio of the B-picture sizes before and after the current I-picture:

$$r_k^B = \frac{\text{mean}(F_{k-n}^B, \ldots, F_{k-1}^B)}{\text{mean}(F_{k+1}^B, \ldots, F_{k+n}^B)}$$

At 740 a determination is made as to whether the ratio $r_k^I$ is greater than a predetermined value T_I_high or is lower than another value T_I_low. Examples of each of the predetermined threshold values "T" referred to herein are given in table 3 further below.

If the ratio $r_k^I$ is greater than a predetermined value T_I_high or is lower than another value T_I_low, then a further determination 750 is made. At 750, it is determined whether $r_k^P < T_{P,low}$, or $r_k^P > T_{P,high}$, or $r_k^B < T_{B,low}$, or $r_k^B > T_{B,low}$. If any of these conditions are met then at 780 the current I-picture is determined to be the start of a new scene. If none of these conditions are met then current I-picture is determined not to start a new scene and the process proceeds at 790 to the next I-picture.

If the ratio $r_k^I$ is neither greater than a predetermined value T_I_high nor is lower than another value T_I_low, then a further determination 760 is made. At 760, it is determined whether $r_k > T_{I,med-high}$, or $r_k < T_{I,med-low}$. If neither of these conditions are met then current I-picture is determined not to start a new scene and the process proceeds at 790 to the next I-picture. If either of the conditions at determination 760 are met, then the process proceeds to determination 770.

At 770, it is determined whether $r_k^P < T_{P,med-low}$, or $r_k^P > T_{P,med-high}$, or $r_k^B < T_{B,med-low}$, or $r_k^B > T_{B,med-low}$. If any of these conditions are met then at 780 the current I picture is determined to be the start of a new scene. If none of these conditions are met then current I-picture is determined not to start a new scene and the process proceeds at 790 to the next I-picture.

From the above it can be seen that an I-picture is denoted as a scene cut if either condition (a) or condition (b) is met:

$$[r_k > T_{I,high} \text{ or } r_k < T_{I,low}] \text{ and}$$

$$[r_k^P < T_{P,low} \text{ or } r_k^P > T_{P,high} \text{ or } r_k^B < T_{B,low} \text{ or } r_k^B > T_{B,low}] \quad \text{a)}$$

$$[r_k > T_{I,med-high} \text{ or } r_k < T_{I,med-low}] \text{ and}$$

$$[r_k^P < T_{P,med-low} \text{ or } r_k^P > T_{P,med-high} \text{ or } r_k^B < T_{B,med-low} \text{ or } r_k^B > T_{B,med-low}] \quad \text{b)}$$

In all other cases, the current I-picture is not denoted as a scene change.

The values of the aforementioned thresholds are given in Table 3. Other threshold values may be used.

TABLE 3

Threshold values for scene cut detection

| Threshold type | Value |
|---|---|
| $T_{I,low}$ | 0.7 |
| $T_{I,high}$ | 1.5 |
| $T_{I,med-low}$ | 0.8 |
| $T_{I,med-high}$ | 1.25 |
| $T_{P,high}$ | 1.65 |
| $T_{P,low}$ | 0.7 |
| $T_{P,med-low}$ | 0.7 |
| $T_{P,med-high}$ | 1.65 |
| $T_{B,low}$ | 0.7 |
| $T_{B,high}$ | 1.65 |
| $T_{B,med-high}$ | 1.65 |
| $T_{B,med-low}$ | 0.7 |

(iv) Using Packet Header Information and the Decoded Pixel Data.

In this method, the scene change is detected by exploiting information both from the packet headers which transport the video signal and also from the pixel values (or features extracted from the pixel values). As explained above in section (ii) the decoded pixel data is available for analysis in, for example a set-top-box. Further, such decoding may be preformed at other nodes in the distribution network, though this is not normally done due to the processing requirements, and may not be possible if the video stream is encrypted.

This method uses the pixel values to determine a difference between two pictures, if the difference is significant enough then it is determined that a scene change has occurred between the two pictures. The present method incorporates into this that a scene change is more likely to occur with an I-picture, less likely with a P-picture, and very unlikely with a B-picture. A difference calculated from comparison of pixel positions between two pictures is weighted to take this into account.

Accordingly there is provided a method of detecting a scene change in a streamed video, the streamed video comprising a series of pictures, the method comprising: determining the encoded size of a picture; determining the picture type according to the encoded size of the picture; calculating, for a plurality of pixel positions, a difference between pixel values at the same position in successive pictures; calculating a measure of difference between successive pictures by summing the pixel differences; applying a weighting to the measure of difference between successive pictures, the weighting dependent upon the picture type; and identifying a new scene when the weighted difference exceeds a threshold value.

Figure 8:
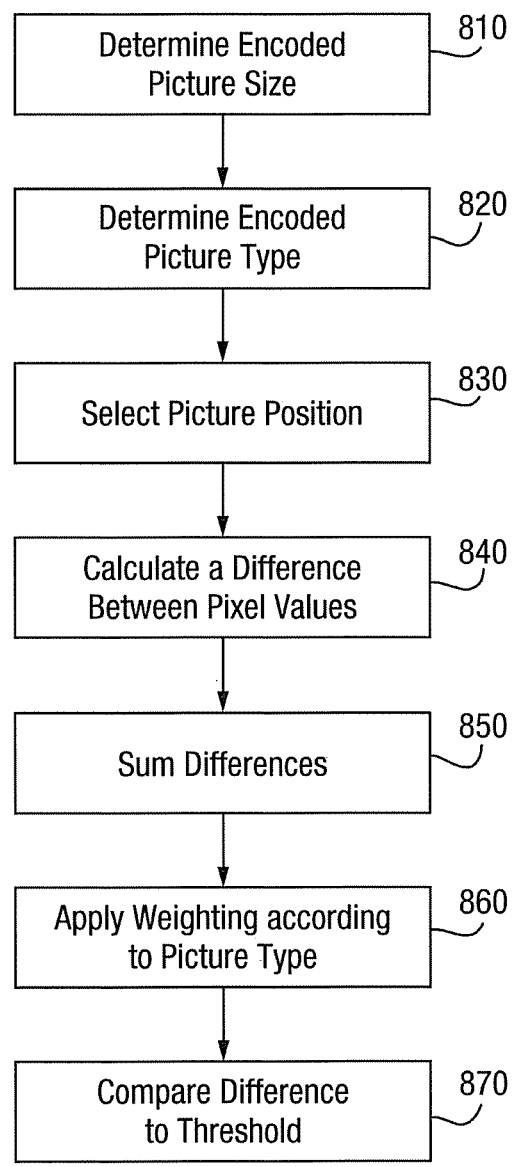
FIG. 8 is a flow diagram showing the method of identifying a scene change using packet header information and the decoded pixel data.

A flow chart illustrating this method is shown in FIG. 8. At 810 the encoded picture size is determined from the packet headers of the video bit stream. At 820 the picture size is used to determine the picture type. This is possible because the sizes of different picture types fall within identifiable ranges, as explained above. At 830 the picture positions that will be compared are selected. For some implementations, every picture location may be compared, but for others a sub-set is selected either according to a predetermined or even a random pattern. At 840, the difference in the pixel values between the two pictures is calculated at each of the selected positions. At 850, these differences are summed. At 860, a weighting is applied to the summed difference, the weighting dependent upon picture type of the latter of the pictures. At 870, the weighted difference is compared to a threshold value. If the total difference exceeds the threshold value then it is determined that a scene change occurs with the latter of the two pictures.

This method may be applied when the video bit stream is encrypted, when the extraction of features directly from the video bit stream would not be feasible. Despite the encryption, the reconstructed pictures which are eventually displayed in the display device are captured and exploited for the scene change detection.

The computation of picture types and sizes using the packet header information, is performed as described in the previous section. Subsequently, the pixel values of two subsequent pictures are examined to determine the degree of difference between the considered pictures. The difference between the pictures is weighted according to the computed picture type because it is expected that scene changes will have been detected at the encoding stage. Therefore, I-pictures are more likely to be representing the start of new scenes than P- or B-pictures.

More specifically, let $P_{m,n}^k$ denote the pixel value at the m-th row and n-th column of the k-th picture. Then, the difference between the picture under consideration and the subsequent picture is computed as:

$$d_{m,n}^k = P_{m,n}^k - P_{m,n}^{k+1}$$

where k=0, ..., K−1, m=0, ..., M, n=0, ... N and K,M,N, denote the number of pictures of the video sequence, the number of rows in a picture, and the number of columns in a picture, respectively. At the next step, the difference of pixels in the two considered pictures is weighted based on the picture type. An example of the weights assigned to each macro-block type is provided in table 4.

TABLE 4

| Weights based on picture type | |
|---|---|
| Picture type | Weight $w_T$ |
| I | 1.0 |
| P | 0.1 |
| B | 0.05 |

Thus, for every picture the following weighted sum is computed:

$$D^k = w_T \cdot \sum_{m=1}^{M} \sum_{n=1}^{N} d_{m,n}^k$$

Subsequently, the weighted sum is compared to a threshold to determine whether the examined picture is a scene cut or not.

Figure 9:
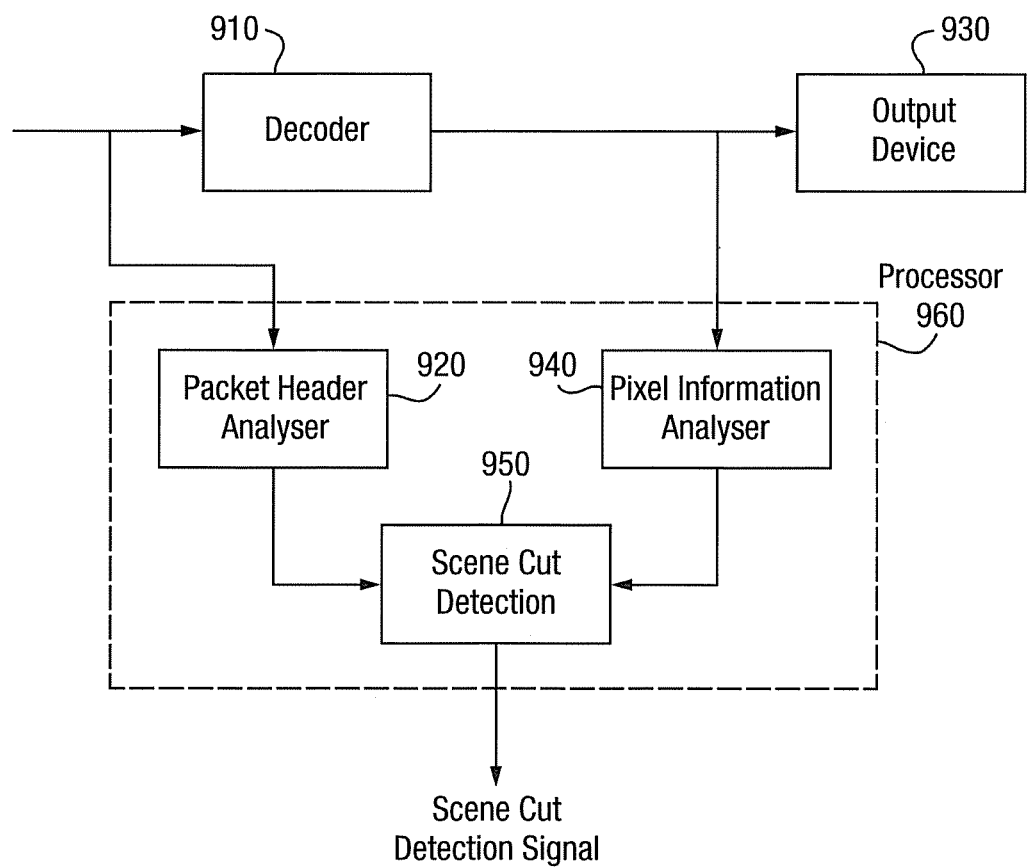
FIG. 9 illustrates an apparatus for performing the above described methods.

FIG. 9 illustrates an apparatus for performing the above described methods. A video bit stream is received by both a decoder 910 and a packet header analyzer 920. The decoder 910 decodes the video bit stream and outputs decoded video, in the form of pixel values, to an output device 930. The decoded video is also output from the decoder 910 to the pixel information analyzer 940. A scene cut detector 950 uses both picture type indications from the packet header analyzer 920 and pixel difference values from the pixel information analyzer 940 to make a determination of when a scene change occurs. Packet header analyzer 920, pixel information analyzer 940 and scene cut detector 950 may all be included within a general purpose processor 960.

The above described scene change detection methods are suitable for use in a quality model. To obtain a more robust indication, one or more of the above methods may be operated in parallel. For example, the same method may be operated twice, using different criteria, such as determining the cost of coding a macro-block from its motion vectors in one method and then from its type in another. The independent indications from each of these methods can be combined to get a more robust detection of a scene change.

In a quality model, once a data loss is detected, then a determination as to whether the data loss impacted a picture at the start of a new scene can be made. The impact of the loss is integrated into the total quality score. For example, a large loss in the I-picture at the start of a new scene will have a greater impact upon the quality than an equivalent loss compared to another picture.

In one embodiment, the quality model is built using an additive model. The degradation of the I-picture scene change loss is then subtracted from the total score according to:

$MOS_{est}$=clean_score−packet_loss_degradation−scene_change_loss_degradation

In another embodiment the quality model is built using a multiplicative model. The degradation of the I-picture scene change loss is then found by:

$MOS_{est}$=clean_score·packet_loss_degradation·scene_change_loss_degradation

In both of the above examples "packet_loss_degradation" and "scene_change_loss_degradation" are values between 0 and 1.

It will be apparent to the skilled person that the exact order and content of the actions carried out in the method described herein may be altered according to the requirements of a particular set of execution parameters. Accordingly, the order in which actions are described and/or claimed is not to be construed as a strict limitation on order in which actions are to be performed.

Further, while examples have been given in the context of particular video transmission standards, these examples are not intended to be the limit of the communications standards to which the disclosed method and apparatus may be applied.

The invention claimed is:

1. A method of detecting a scene change in a streamed video, the streamed video comprising a series of pictures, the method comprising:
   determining the encoded size of a picture;
   determining the picture type according to the encoded size of the picture;
   calculating, for a plurality of pixel positions, a difference between pixel values at the same position in two successive pictures;
   calculating a measure of difference between the two successive pictures by summing the pixel differences;
   applying a weighting to the measure of difference between the two successive pictures, the weighting dependent upon the picture type of the latter of the two successive pictures; and
   identifying a new scene when the weighted difference exceeds a threshold value, wherein the threshold value is determined by taking a weighted average of differences calculated between a predetermined number of pictures that are immediately preceding the two successive pictures, and wherein the differences between the pictures that are more recently preceding the two successive pictures are given a greater weight.

2. The method of claim 1, wherein the picture type comprises one of: intra-coded; uni-directional predictive pictures; and bi-directional predictive pictures.

3. An apparatus for detecting a scene change in a streamed video, the streamed video comprising a series of pictures, the apparatus comprising:
   a processor arranged to determine the encoded size of a picture, and to determine the picture type according to the encoded size of the picture;
   the processor further arranged to calculate:
   a difference between pixel values at the same position in two successive pictures for a plurality of pixel positions; and
   a measure of difference between the two successive pictures by summing the pixel differences;
   the processor further arranged to apply a weighting to the measure of difference between the two successive pictures, the weighting dependent upon the picture type of the latter of the two successive pictures; and
   a scene change detector arranged to identify a new scene when the weighted difference exceeds a threshold value, wherein the threshold value is determined by taking a weighted average of differences calculated between a predetermined number of pictures that are immediately preceding the two successive pictures, and wherein the differences between the pictures that are more recently preceding the two successive pictures are given a greater weight.

* * * * *